2 Sheets—Sheet 1

P. A. JESSON.

Assignor to N. WEBER.

MACHINE FOR STRETCHING HIDES OR SKINS.

No. 10,860. Reissued Aug. 23, 1887.

WITNESSES:
H. Brown
A. D. Harrison

INVENTOR:
P. A. Jesson
by Wright, Brown & Crosby
Attys.

2 Sheets—Sheet 2.

P. A. JESSON.

Assignor to N. WEBER.

MACHINE FOR STRETCHING HIDES OR SKINS.

No. 10,860. Reissued Aug. 23, 1887.

WITNESSES:
H. Brown.
A. D. Harrison.

INVENTOR:
P. A. Jesson
by Wright, Brown & Crosby
Attys.

UNITED STATES PATENT OFFICE.

PIERRE ALPHONSE JESSON, OF PARIS, FRANCE, ASSIGNOR TO NICHOLAS WEBER, OF LYNN, MASSACHUSETTS.

MACHINE FOR STRETCHING HIDES OR SKINS.

SPECIFICATION forming part of Reissued Letters Patent No. 10,860, dated August 23, 1887.

Original No. 352,026, dated November 2, 1886. Application for reissue filed April 1, 1887. Serial No. 233,321. Patented in France March 11, 1884, No. 142,758; in Germany December 9, 1884, No. 33,014, and in England June 15, 1885, No. 7,268.

*To all whom it may concern:*

Be it known that I, PIERRE ALPHONSE JESSON, a citizen of the Republic of France, residing at Paris, in the said Republic, have invented certain new and useful Improvements in Machinery for Stretching Hides or Skins, of which the following is a specification, reference being had to the accompanying drawings.

My invention relates to machines for stretching and softening a hide or skin by a scraping action on the flesh side thereof; and it consists, first, in the combination of a roll of yielding material, a bar or stretcher arranged in suitable relation to said roll to press an interposed sheet or piece of leather directly against said roll, a carrier and mechanism for reciprocating it, whereby said roll and stretcher are moved alternately forward and backward in unison, and mechanism whereby said roll and stretcher are closed upon the interposed material during the forward movement and opened or separated to release said material during their backward movement. The material being treated is inserted by the operator between the roll and stretcher, with the flesh side against the stretcher, and is held by him to prevent it from moving with the roll and bed during their forward movement. The pressure of the stretcher against the leather at a point where the latter is backed or supported by the yielding roll causes the stretcher to exert a pulling or stretching and a scraping action on the leather, whereby it is quickly made soft and pliable.

The invention also consists in the special organization of mechanism hereinafter described, whereby the roll and stretcher are alternately closed upon the material and separated.

Figure 1:
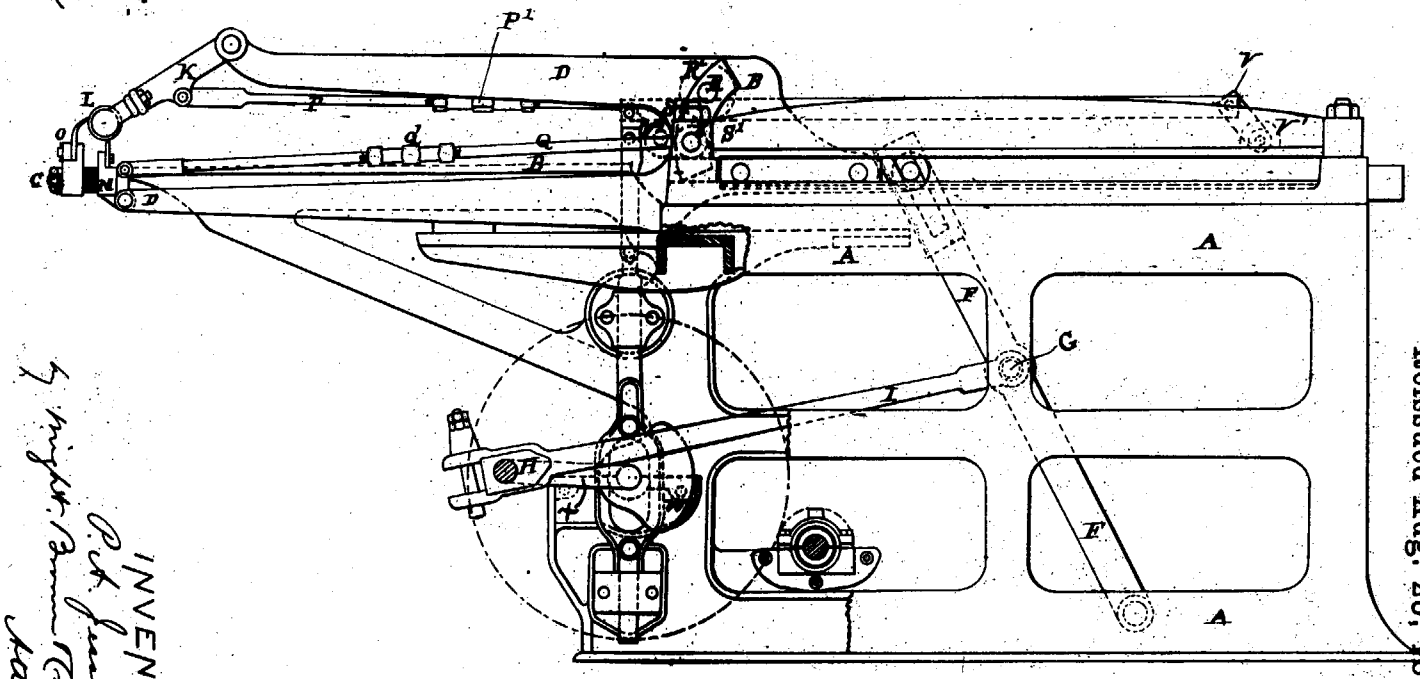
Figure 2:
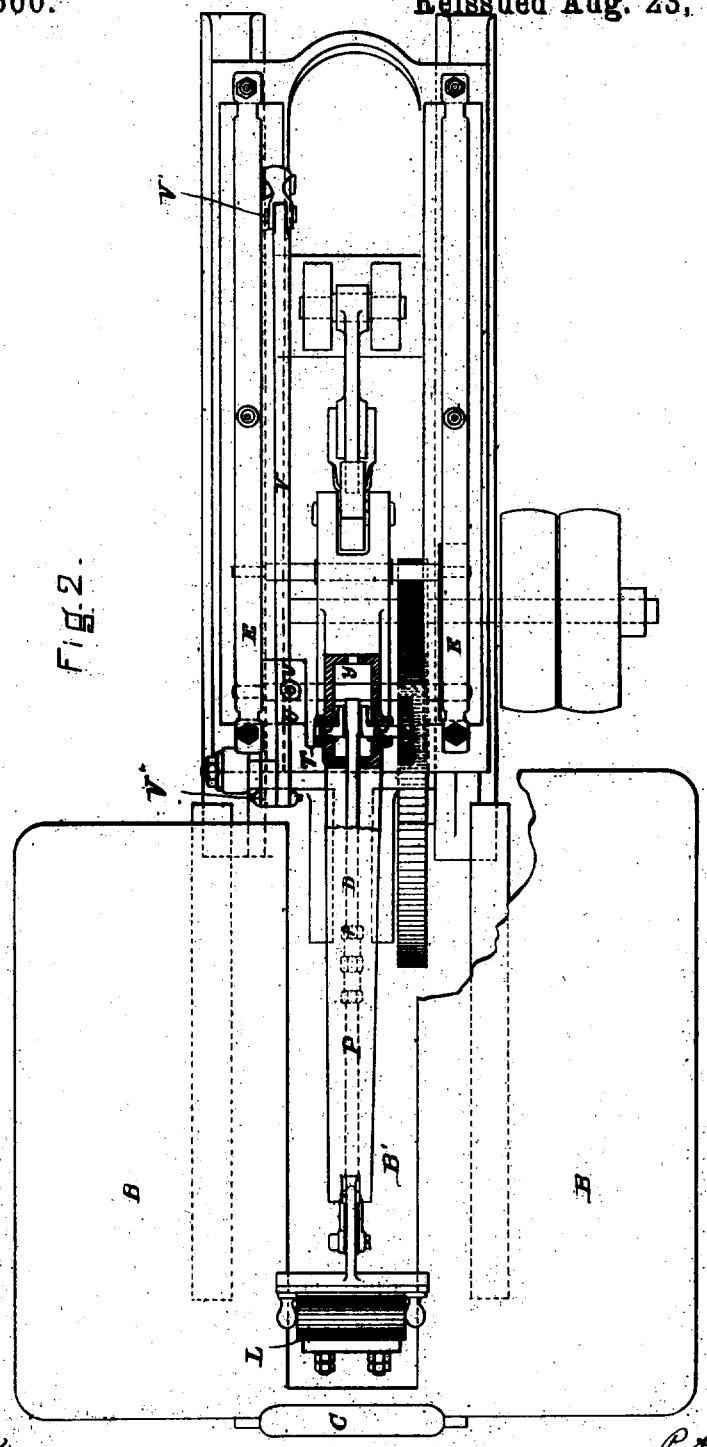

Figure 1 shows a side elevation of the machine, the frame partly broken away to show the operative parts. Fig. 2 is a plan view.

A is a frame of cast-iron, carrying the table B, in which is a large notch or opening, B′, for the free passage of the plier. On the front edge of the table a rubber bolster, C, is provided, in order to prevent the leather from sliding, the workman leaning with his body against it to hold it fast during the process of stretching. The plier D, supported by the slide-bars E, is V-shaped, and to it the lever F imparts a seesaw or reciprocating motion. The latter, having its fulcrum at the point G, gets its motion by the crank-shaft H and connecting-rod I. The shaft H is set to work, in any ordinary manner, by a pulley and a gear-wheel.

The arms of the plier D bear in front the parts for working the leather. The upper arm, by means of a joint, K, carries the pressing-roller L, made of rubber, and the lower arm by means of joint M, and the supporting-bar and the stretcher, of steel, O. The rods P and Q, which can be lengthened and shortened by right-and-left-hand screw-nuts P′ Q′, connect the joints K and M with mechanism performing the opening and closing of the pliers, this mechanism, composed of two small crank-shafts, R S, being lodged in the body *y* of the plier, and connected by cog-wheels R′ S′, keyed on the outside ends.

R′ is a little larger than S′, as the joint K has to make more way than joint M, so that the roller L may be lifted far enough from the table when the plier is opened to allow the workman to freely move the skin on the table. The crank-shaft R carries, outside of the body of the plier, (opposite to the wheel R′,) a short crank-arm, T, the pin of which is lodged in a sliding bush, U, which, during the to-and-fro motion of the plier sliding on the parallel rod V, follows the motion of the plier. The parallel rod V, supported by the links V′ V′, gets, by the eccentric W and the rod X during the going of the plier, a lowered position and during the return a raised position. It results therefrom that during the going or forward movement the sliding bush U will hold the arm T down, and consequently the crank-shafts R S will draw back the joints K M by means of the rods P Q, and keep the roll and stretcher closed upon the leather interposed between them, so that the leather is stretched and scraped by the conjoint operation of the roll and stretcher, while during the return or backward movement of the plier the parallel rod V in its elevated position raises the arm T by means of the sliding bush U, and consequently the crank-shafts R S turn the joints K M from one another and separate the roll and blade from each other.

I claim—

1. The combination, substantially as set forth, of a roll of yielding material, a stretcher arranged in suitable relation to said roll to press an interposed sheet or piece of leather directly against said roll, a carrier and mechanism, substantially as described, for reciprocating the same, whereby said stretcher and roll are moved alternately backward and forward in unison, and mechanism, substantially as described, whereby said roll and stretcher are closed upon the interposed material during the forward movement and opened or separated to release the material during the backward movement.

2. In a machine for stretching hides or skins, the means for opening and closing the plier close to the point of operation, consisting of the joints K and M, the rods P and Q, and the crank-shafts R S, lodged in the body D of the pliers, all combined and operated substantially as shown and described.

3. The combination of the arm T of the upper crank-shaft, R, with a parallel bar, V, applied to the frame by means of a sliding bush, U, substantially as shown and described, for the purpose of keeping the plier closed during the whole way in one direction and open during its return.

In testimony whereof I affix my signature in presence of two witnesses.

PIERRE ALPHONSE JESSON.

Witnesses:

MATHIAS KLEIN,

GUSTAVE A. DITTMAR.